US008315446B2

(12) United States Patent
Raundahl et al.

(10) Patent No.: US 8,315,446 B2
(45) Date of Patent: Nov. 20, 2012

(54) BREAST TISSUE DENSITY MEASURE

(75) Inventors: Jakob Raundahl, Kokkedal (DK);
Marco Loog, Rotterdam (NL); Mads Nielsen, Dragor (DK)

(73) Assignee: Synarc Inc., Newark, CA (US)

( * ) Notice: Subject to any disclaimer, the term of this patent is extended or adjusted under 35 U.S.C. 154(b) by 917 days.

(21) Appl. No.: 12/223,550

(22) PCT Filed: Feb. 9, 2007

(86) PCT No.: PCT/EP2007/051284
§ 371 (c)(1),
(2), (4) Date: Feb. 17, 2009

(87) PCT Pub. No.: WO2007/090892
PCT Pub. Date: Aug. 16, 2007

(65) Prior Publication Data
US 2009/0296999 A1     Dec. 3, 2009

(30) Foreign Application Priority Data
Feb. 10, 2006    (GB) .................................. 0602739.5

(51) Int. Cl.
*G06K 9/00*     (2006.01)
*G06K 9/62*     (2006.01)
*G06K 9/40*     (2006.01)
(52) U.S. Cl. ........ 382/128; 382/131; 382/159; 382/100; 382/274
(58) Field of Classification Search .................. 382/128, 382/131, 132, 159, 160, 169, 274, 100, 129, 382/130, 133, 134, 168, 173, 181, 194, 209, 382/216, 219, 232, 305, 254, 276, 307, 321
See application file for complete search history.

(56) References Cited

U.S. PATENT DOCUMENTS
2004/0151356 A1 *   8/2004   Li et al. ......................... 382/131
(Continued)

FOREIGN PATENT DOCUMENTS
JP     2004 313478     11/2004
(Continued)

OTHER PUBLICATIONS
R. Nakayama et al., "Development of New Filter Bank for Detectionof Nodular Patterns and Linear Patterns in Medical Images", *Systems and Computers in Japan*, 36(13), pp. 81-91 (2005).
(Continued)

*Primary Examiner* — Chuong A. Luu
(74) *Attorney, Agent, or Firm* — Edwards Wildman Palmer LLP; Peter C. Lauro, Esq.

(57) ABSTRACT

Mammogram images are processed by computer to derive automatically a value for a parameter useful in detecting differences in breast tissue in subsequent images of the same breast or relative to a control group of such images, said derived parameter being a parameter that changes alongside changes in breast density and is hence useful in assessing cancer risk. The method comprises the steps of processing each image of at least part of a breast by: computing for pixels of the image a quotient value representative of the aspect ratio of tissue structures depicted in the image; using a trained classifier to classify said pixels according to their respective said quotient values and assigning a score to the respective pixels representing their classification with respect to at least two classes; deriving said parameter that changes alongside changes in breast density based on the aggregate pixel membership scores of said classes. The classifier may be trained either by unsupervised learning or by supervised learning.

21 Claims, 9 Drawing Sheets

U.S. PATENT DOCUMENTS

2004/0181375 A1* 9/2004 Szu et al. .................. 703/2
2009/0232376 A1 9/2009 Raundahl et al.

FOREIGN PATENT DOCUMENTS

JP 2005 066194 3/2005
WO 0079474 A1 12/2000
WO WO-03/042712 5/2003

OTHER PUBLICATIONS

R. Nakayama et al., "Computer-aided diagnosis scheme for histological classification of clustered microcalcifications on magnification mammograms", *Medical Physics*, 31(4), pp. 789-799 (Apr. 2004).

Boone J.M., et al., "A breast density index for digital mammograms basd on radiologists ranking", Journal of Digital Imaging, vol. 11, No. 3, pp. 101-115, Aug. 1998.

Boyd, N.F., et al., "Mammographic breast density as an intermediate phenotype for breast cancer", The Lancet Oncology, vol. 5, 00. 798-808, 2005.

Boyd, N.L., et al., "Mammographic density as a surrogate marker for the effects of hormone therapy on risk of breast cancer", Cancer Epidemiology Biomarkers & Prevention, vol. 15, No. 5, p. 961, 2006.

Byng, J.W., et al., "Symmetry of projection in the quantitative anlaysis of mammographic images", European Journal of Cancer Prevention, vol. 5, pp. 319-327, 1996.

Byng, J.W., et al., "The quantitative analysis of mammographic densities," Physics in Medicine and Biology, vol. 39, p. 1629-38, 1994.

Byng, J.W., et al., "Automated analysis of mammographic densities,"Physics in Medicine and Biology, vol. 41, pp. 909-923, 1996.

Claus, E., et al., "Autosomal dominant inheritance of early-onset breast cancer, implications for risk prediction", Cancer, vol. 73, No. 3, pp. 643-651, 1994.

Gail, M.H., et al., "Projecting individualized probabilities of developing breast cancer for white females who are being examined annually", Journal of the National Cancer Institute, vol. 81, No. 24, pp. 1879-1886, Dec. 1989.

Guyon, I., et al., "An introduction to variable and feature selection", The Journal of Machine Learning Research, vol. 3, pp. 1157-1182, 2003.

Huo, Z. et al., "Computerized analysis of mammographic parenchymal patters for breast cancer risk assessment: Feature selection", Medical Physics, vol. 27, p. 4, 2000.

Jain, A.K., et al., "Statistical pattern recognition: A review", IEEETronPAMI, vol. 22, No. 1, pp. 4-37, 2000.

Karssemeijer, N., "Automated classification of parenchymal patterns in mammograms," Physics in Medicine and Biology, vol. 43, pp. 365-378, 1998.

Koenderink, J.J., "The structure of images", Biological cybernetics, vol. 50, No. 5, pp. 363-370, 1984.

Koenderink, J., et al., "Representation of local geometry in the visual system", Biological cybernetics, vol. 55, No. 6, pp. 367-375, 1987.

Otten, J.D.M., et al., "Effect of recall rate on earlier screen detection of breast cancers based on the dutch performance indicators", Journal of the National Cancer Institute, vol. 97, No. 10, pp. 748-754, May 2005.

Petroudi, S., et al., "Breast density segmentation using texture", in International Workshop on Digital Mammography, Astley, S.M., et al., Springer, 2006, pp. 609-615.

Pettersen P.C., et al., "Parallel assessment of the impact of different hormone replacement therapies on breast density by radiologist and computer-based analyses of mammograms", Climacteric. Apr. 2008; 11(2): 135-43.

Raundahl, J., et al., "Quantifying effect-specific mammographic density", Med Image Comput Assist Interv. 2007;10 (Pt 2): 580-7.

Raundahl, J., et al., "Automated Effect-specific Mammographic Pattern Measures", IEEE Transactions on Medical Imaging, vol. 27, No. 8, Aug. 2008 1054-1060.

Raundahl, J., Dissertation, estimated publication date Dec. 26, 2007.

Romeny, Haar B.M. ter et al., "Higher order differential structure of images", Image and Vision Computing, vol. 12, No. 6, pp. 317-325, Jul./Aug. 1994.

Tromans C., et al., "An alternative approach to measuring volumetric mammographic breast density", in International Workshop on Digital Mammography, Astley, S.M. et al., Eds. Springer, 2006, pp. 26-33.

Whitney, A., et al., "A direct method of nonparametric measurement selection", in IEEETrans. Comput., vol. 20, 1971, pp. 1100-1103.

Zhou, et al., Medical physics 28(6), Jun. 2001, 1056-1069.

* cited by examiner

BREAST TISSUE DENSITY MEASURE

RELATED APPLICATION

This application is the U.S. national phase, pursuant to 35 U.S.C. §371, of International application No. PCT/EP2007/051284, filed Feb. 9, 2007, published in English on Aug. 16, 2007 as WO 2007/090892, and claims priority to GB 0602739.5, filed Feb. 10, 2006.

The present invention relates to a method of detecting differences in breast tissue in subsequent images of the same breast.

Breast cancer is one of the largest serious diseases among women in the western world. It is the most common cancer in women accounting for nearly one out of every three cancers diagnosed in the United States. It is also the most common and deadly cancer for women on a global scale, where breast cancer accounts for 21% of all cancer cases and 14% of all cancer deaths.

However, if detected sufficiently early, there is a high probability of survival. Detection of breast cancer can be very difficult, since the first signs of breast cancer are often asymptomatic.

Mammograms have thus far been found to be the most effective way to detect breast cancer early, sometimes up to two years before a lump in the breast can be felt. Mammography is a specific type of imaging that uses a low-dose x-ray system. Once an image has been developed, doctors examine the image to look for signs that cancer is developing. Naturally, where human intervention is required, there is room for error or misjudgment. A lot of effort has therefore been put into the field of improving the processing of mammograms. The mammograms are mainly analysed by radiologists who look for abnormalities that might indicate breast cancer. These abnormalities include small calcifications, masses and focal asymmetries.

Various breast imaging techniques now exist that attempt to detect breast cancer earlier and in a more predictable fashion.

Digital mammography, also called full-field digital mammography (FFDM), is a mammography system in which the x-ray film is replaced by solid-state detectors that convert x-rays into electrical signals. These detectors are similar to those found in digital cameras. The electrical signals are used to produce images of the breast that can be seen on a computer screen or printed on special film similar to conventional mammograms. From the patient's point of view, digital mammography is essentially the same as the screen-film system.

Computer-aided detection (CAD) systems use a digitised mammographic image that can be obtained from either a conventional film mammogram or a digitally acquired mammogram. The computer software then searches for abnormal areas of density or calcification that may indicate the presence of cancer. The CAD system highlights these areas on the images, alerting the radiologist to the need for further analysis.

The present invention uses change in breast tissue to identify the possible risk of cancer. The methods of the invention described below do not seek to locate features within the image used, but rather assign an overall score to the image which is indicative of the probability of the image being associated with a higher breast density and hence providing a measure of the risk of cancer.

Several approaches to automatic or semi-automatic assessment of mammographic breast density have been suggested previously. The majority of these have been aimed at reproducing the radiologists' categorical rating system. Boone et al [Journal of Digital Imaging 11(3) August 1998, 101-115] aimed at making a continuously scaled breast density index. Six mathematical features were calculated from the mammograms and used in conjunction with single value decomposition and multiple linear regression to calculate a computerised breast density. The training was done using a collection of mammograms sorted by their density as perceived by an expert.

Karssemeijer [Physics in Medicine and Biology 43 (1998) 365-378] divided the breast area into different regions and extracted features based on the grey level histograms of these regions. Using these features a kNN classifier is trained to classify a mammogram into one of four density categories. Byng et al [Physics in Medicine and Biology 41 (1996) 909-923] used measures of the skewness of the grey level histogram and of image texture characterised by the fractal dimension. They showed that both measures are correlated with the radiologists' classifications of the mammographic density. Tromans et al and Petroudi et al [in Astley et al; International workshop on Digital Mammography, Springer 2006, 26-33 and 609-615] used automated density assessment employing both physics based modelling and texture based learning of BI-RADS categories and Wolfe Patterns.

The Breast Imaging Reporting and Data System (BI-RADS) is a four category scheme proposed by the American College of Radiology. The BI-RADS categories are:
1. Entirely fatty
2. Fatty with scattered fibroglandular tissue
3. Heterogeneously dense
4. Extremely dense.

In practice, these classifications are used to alert clinicians that the ability to detect small cancers in the dense breast is reduced. The four categories are represented by the numbers one to four in order of increasing density.

Others, including Zhou et al [Medical physics 28(6), June 2001, 1056-1069] have used thresholding of the image based on properties of the grey level histogram to get an estimate of the percentage of density in the breast or (Yaffe et al [Physics in Medicine and Biology 39 (1994) 162938]) use thresholding done by a radiologist. In the thresholding method, the reading radiologist determines an intensity threshold using a slider in a graphical user interface. The radiologist is assisted visually by a display showing the amount of dense tissue corresponding to the current slider position. The density is defined as the ratio between segmented dense tissue and total area of breast tissue. The continuous nature of such threshold adjustment makes the method more sensitive than the BI-RADS, Wolfe patterns and related scoring systems with a low number of categories when detecting or monitoring, perhaps small, density changes.

A currently frequently discussed issue related to breast cancer risk is the potential influence of hormone replacement therapy taken after the menopause. If breast density is indeed a surrogate measure of risk for developing cancer in the breast, a sensitive measure of changes in breast density during hormone dosing provides an estimate of the gynecological safety of a given treatment modality. Hence, the concept of breast density has an ongoing interest.

The meaning of the word density depends on the context. The physical density states how much the breast tissue attenuates x-rays locally. An assessment of the projected area and specifically the distribution of fibroglandular tissue is often called dense tissue, and can be thought of as a "biological density". This can be considered as an intrinsic property of the entire breast, and is the type of density referred to in the context of Wolfe Patters and related assessments.

The present inventors aim to provide a framework for obtaining more accurate and sensitive measurements of breast density changes related to specific effects, specifically by using a statistical learning scheme for devising a non-subjective and reproducible measure, given effect-grouped patient data.

The present invention provides a method of processing a mammogram image to derive a value for a parameter useful in detecting differences in breast tissue in subsequent images of the same breast or relative to a control group of such images, said derived parameter being a parameter that changes alongside or together with changes in breast density, the method comprising the steps of processing an image of at least part of a breast by:

computing for pixels of the image a quotient value representative of the aspect ratio of tissue structures depicted in the image;

using a trained classifier to classify said pixels according to their respective said quotient values and assigning a score to the respective pixels representing their classification with respect to at least two classes;

deriving said parameter that changes alongside changes in breast density based on the aggregate pixel membership scores of said classes.

According to one practice of the invention, the trained classifier is trained by unsupervised learning. According to a second practice of the invention, the trained classifier is trained by supervised learning. Examples of both are provided below.

Optionally, said classifier is trained by supervised learning based on a set of images associated with a higher breast density and a set of images associated with a lower breast density.

The pixels may be scored as belonging to one of said classes, i.e. may be allocated with a probability score of 1 to the specific class judged most appropriate, or on the other hand may be scored according to their probability of belonging to at least one of said classes with a probability score of up to 1.

Said quotient value may be determined for each said pixel at each of a plurality of scales, suitably three scales.

Said quotient values may be determined as the normalised difference between eigenvalues of a Hessian matrix based on Gaussian derivatives at a predetermined scale of pixels of the image, which Gaussian derivatives relate the intensity of each pixel to the intensities of the neighbours of said pixel.

According to one preferred aspect of the present invention there is provided a method of processing a mammogram image to derive a value for a parameter useful in detecting differences in breast tissue in subsequent images of the same breast, said derived parameter being a parameter that changes alongside changes in breast density, the method comprising the steps of:

processing an image of at least part of a breast;

computing a quotient value representative of the aspect ratio of tissue structures depicted in the image for pixels of the image;

plotting these values on a pre-determined model of a cluster map, said cluster map having at least two pre-plotted points;

clustering the plotted values around said at least two pre-plotted points to result in two discrete clusters; and deriving said parameter that changes alongside changes in breast density by computing the difference in area between said two clusters.

In a preferred embodiment the pre-determined model is defined in 3-dimensional space in which the three dimensions represent the quotient value when calculated at different scales.

Preferably, the step of clustering further comprises:

calculating which of said at least two pre-plotted points each plotted value is closest to; and assigning each value accordingly to said closest pre-plotted point to result in said two discrete clusters of plotted points.

In an embodiment, there is provided a preliminary step of preparing said pre-determined model of the cluster map incorporating said at least two pre-plotted points.

The step of preparing the model of the cluster map may further comprise:

a) computing a quotient value for pixels in a test image of a breast based on the results of Hessian matrices compiled for said pixels in the image;

b) plotting each quotient value in 3-dimensional space;

c) randomly selecting at least two points amongst the quotient values as starting points;

d) calculating the distance between each quotient value and each starting point and assigning each quotient value to the starting point to which it is nearest;

e) calculating a mean of each group of points and redefining the starting point as the calculated mean point;

iteratively repeating steps d) and e) until the calculated mean point is equal to the starting point, whereby the final calculated mean points are arranged to be the pre-plotted points of the model of the cluster map.

Preferably, the number of pre-plotted points determines the number of resulting clusters.

More preferably, the pre-determined model of the cluster map has four pre-plotted points.

In a preferred embodiment, four points are randomly selected as starting points to result in said four pre-plotted points for the model of the cluster map.

Preferably, the Hessian matrices are derived from Gaussian derivatives of the pixels in the image.

The method may further comprise deriving Gaussian derivates at three different scales of the image to result in three different quotient values for each of said pixels, wherein the three quotient values correspond to the three dimensions of the pre-determined model.

Preferably, said quotient values define characteristics representative of the shape of objects present in the image.

More preferably, a quotient value of relatively large magnitude represents a substantially elongate object located in the image.

The method may further comprise deriving a parameter of the same breast at a subsequent period of time and computing the difference in the value of the first and subsequent parameter, wherein the difference is representative of changes in the breast tissue of the breast.

The method may include an additional first step of obtaining the required digital breast image by X-ray photography of a patient.

The method may include a further step of comparing the obtained parameter value for an image with equivalent parameter values obtained previously for which cancer risk has been quantified and thereby obtaining a quantitative cancer risk assessment for the image.

The present invention further extends to a pre-programmed computational device means for receiving a set of digital data representative of at least part of a breast;

means for computing a quotient value representative of an aspect ratio of tissue structures depicted in the image for pixels of the image;

a trained classifier pre-programmed therein to classify said pixels according to their respective said quotient values and to assign a score to the respective pixels representing their classification with respect to at least two classes; and means for deriving said parameter that changes alongside changes in breast density based on the aggregate pixel membership scores of said classes.

The pre-programmed computational device may be one wherein said trained classifier has been trained by unsupervised learning or else one wherein said trained classifier has been trained by supervised learning, suitably based on a set of images associated with a higher breast density and a set of images associated with a lower breast density.

The programming may be such that said pixels are scored as belonging to one of said classes or else are scored according to their probability of belonging to at least one of said classes.

The programming may be such that said quotient value is determined for each said pixel at each of a plurality of scales.

The programming may be such that the quotient values are determined as the normalised difference between eigenvalues of a Hessian matrix based on Gaussian derivatives at a pre-determined scale of pixels of the image, which Gaussian derivatives relate the intensity of each pixel to the intensities of the neighbours of said pixel.

In accordance with one preferred aspect of the invention, the programmed device is one having:

means for receiving a set of digital data representative of at least part of a breast;

means for computing a quotient value representative of an aspect ratio of tissue structures depicted in the image for pixels of the image;

means for plotting these values on a pre-determined model of a cluster map, said cluster map having at least two pre-plotted points;

means for clustering the plotted values around said at least two pre-plotted points to result in two discrete clusters; and means for deriving a parameter that changes alongside changes in breast density by computing the difference in area between said two clusters, wherein the parameter enables detection of differences in breast tissue in subsequent images of the same breast.

The present invention further extends to an instruction set comprising instructions for operating a programmable device to carry out a described method or to become a programmed device as described.

Embodiments of the present invention will hereinafter be described, by way of example, with reference to the accompanying drawings, in which.

We shall describe first an embodiment of the invention based on classifying pixels of an image using a trained classifier which has been trained by unsupervised learning.

Figure 1:
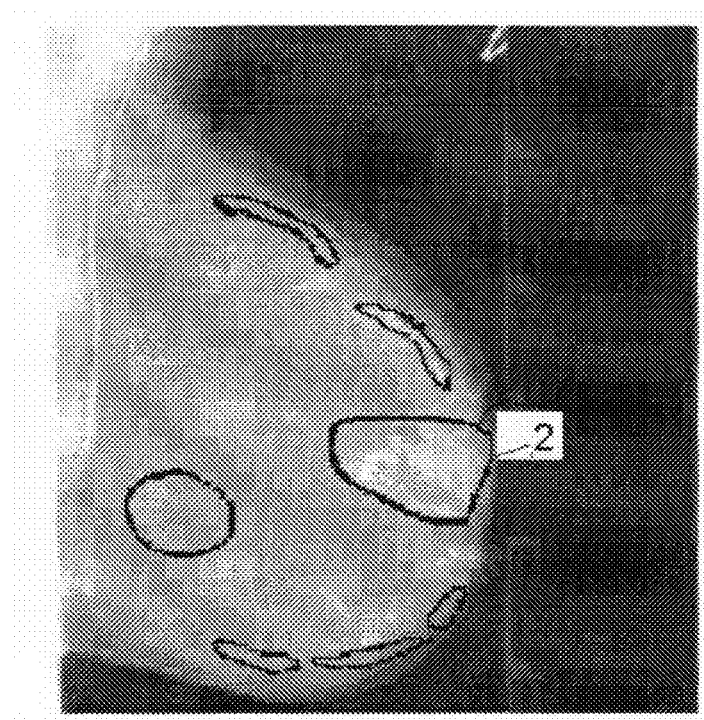
FIG. 1 is an image of a breast that shows examples of the different types of tissue that can be distinguished from a mammogram.

Numerous studies have investigated the relation between mammographic density and breast cancer risk, and women with high breast density appear to have a four to six fold increase in breast cancer risk. Therefore the density is an important feature embedded in a mammogram. In this context and as shown in FIG. 1, the density refers to a specialist's assessment (typically a radiologist) of the projected area 2 of fibro glandular tissue—sometimes called dense tissue.

Figures 2A, 2B, 2C:
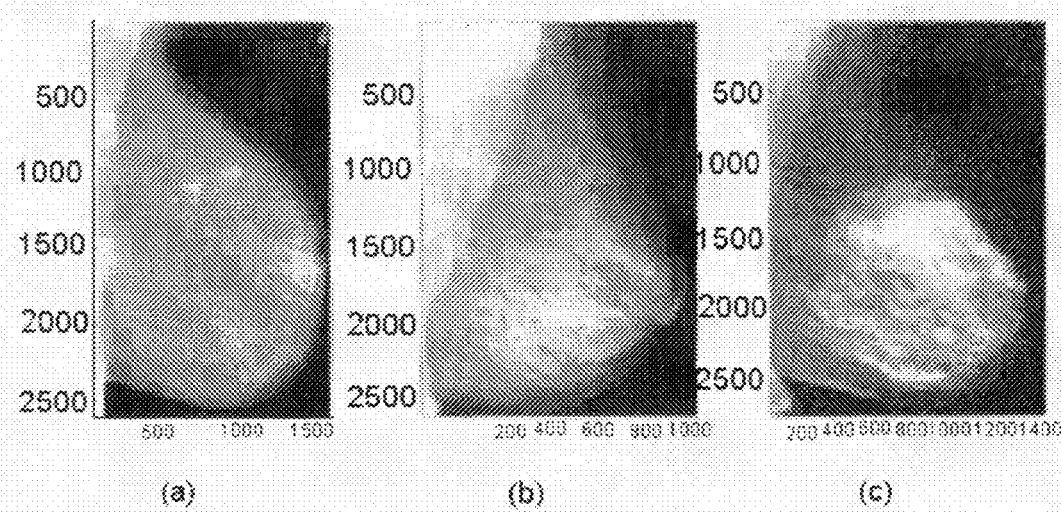
FIGS. 2A, 2B and 2C show three example mammograms depicting different mammographic densities.

As an example, FIG. 2A to 2C respectively show three example mammograms depicting low, medium and high mammographic densities.

Typically a mammogram is classified into one of four or five density categories, e.g. Wolfe patterns and BI-RADS. These classifications are subjective and sometimes crude. They may be sufficient in some cases and for single measurements, but for serial, temporal analysis it is necessary to be able to detect more subtle changes.

HRT treatment is known to increase breast density. The inventors have herein attempted to distinguish between an increase in breast density caused by HRT treatment and placebo populations.

The inventors have used pattern recognition and data mining to enable the density measurement required to give an indicative result of increased risk of breast cancer.

The first embodiment of the invention is based on the hypothesis that the breast tissue can be divided into subclasses describing its density. Each subclass should in theory relate to the anatomical composition of the surrounding breast tissue. Such labelling should be performed on the mammogram and each subclass should have some common statistical features. Following this, an unsupervised clustering algorithm with an appropriate similarity measure based on these features can be used to classify the subclasses in an unsupervised way.

Once such unsupervised clustering has been performed, it can be used to train a classifier based on which new mammograms may be labelled. After labelling the pixels in a mammogram, a score is computed from this using a second classifier. The end result of this is a pattern recognition based density classifier.

Figure 4:
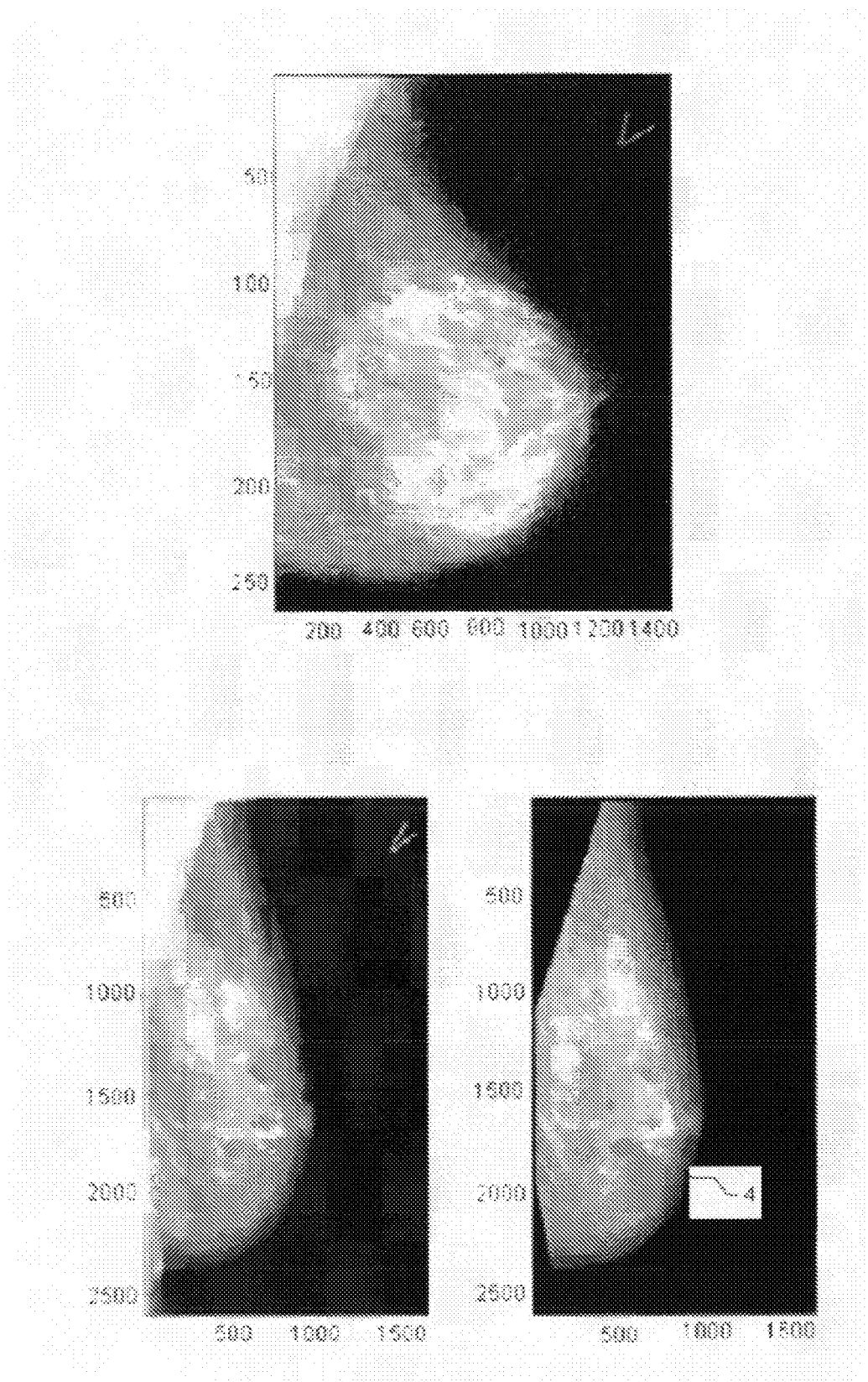
FIG. 4 shows the segmentation of an image of a breast.

A region of interest is needed in which to estimate the mammographic density. Since the density is scattered in the interior breast tissue, a fairly rough segmentation along the boundary of the breast is sufficient. The process is illustrated in FIG. 4. Delineation of the boundary may be done manually using 10 points along the boundary connected with straight lines resulting in a decagon region of interest as seen in the last panel of the figure. To ensure reproducible results, the same segmentation technique is applied to all images.

The first step is to construct a Hessian matrix of partial derivatives based on the pixel intensities of the image. Hessian matrices will be well known to those skilled in the art, however, to summarise, a Hessian matrix is a matrix of second derivatives of a multivariate function, i.e. the gradient of the gradient of a function. Therefore, the Hessian matrix describes the second order intensity variations around each point of a 3D image.

By using eigenvalues of the Hessian matrix, it is possible to characterise the second order structure of the image, that is whether the part of the image corresponds to a hill or valley. The ratio of the difference in absolute eigenvalues to their sum gives a strong response when one eigenvalue is large and the other small. This corresponds conceptually to there being a hill (or valley) in one direction, but none in the perpendicular direction. Thus, it is possible to detect that an elongated, vessel-like structure is present at that point in the image.

To compile the Hessian matrix, it is first necessary to obtain Gaussian derivatives of pixels of the image relating the intensity of each pixel to the intensities of its neighbours. It will be appreciated that the eventual results will be better if all, or nearly all, pixels are used. Gaussian derivatives are well known for their use in extracting features of computer images. Gaussian derivatives are used to extract features from the image at three different scales (in this example 1, 2 and 4 mm).

General scale space representation $$L: \mathbb{R}^N \times \mathbb{R}_+ \to \mathbb{R}$$

for any N-dimensional signal $$f: \mathbb{R}^N \to \mathbb{R}$$

is defined by $$L(x; t) = \int_{\xi \in \mathbb{R}^N} f(x - \xi) g(\xi) d\xi$$

where $$g(x, t) = \frac{1}{(2\pi\sigma^2)^{\frac{D}{2}}} e^{-(x_1^2 + \ldots + x_D^2)/2t}$$

and the variance t is the scale parameter. Based on this representation, scale space derivatives are defined by $$L_{x^\alpha}(\cdot; t) = \partial_{x_1^{\alpha_1} \ldots x_N^{\alpha_N}} L(\cdot; t) = \left( \partial_{x_1^{\alpha_1} \ldots x_N^{\alpha_N}} g(\cdot; t) \right) * f$$

where $\partial_{x_i}$ denotes partial differentiation along axis i, $\alpha_i$ is the order of differentiation for axis i, and * denotes convolution. In summary, the width of the Gaussian kernel determines the scale and the differentiation is carried out on this kernel prior to the convolution to get the scale space derivative.

The Gaussian derivatives are derived so that it is possible to compare the characteristics of one pixel with its neighbour. For example, it is possible to determine which areas of the image have the same grey values by looking at the grey value of one pixel and comparing it to the grey value of the next pixel to work out a difference. If this is performed on a standard image, the results would be very sensitive to noise and there is a risk that the measurements would be impaired. By taking a Gaussian derivative, the image is de-focused, i.e. blurred to minimise the noise. While this is preferable, it is of course appreciated that other methods may be used to achieve the same results. For example, the original image could be used with further processing that accounts for this additional noise.

Use of Gaussian derivatives also allows for a choice of scales i.e. a choice of to what extent the image is blurred. In this embodiment, three different scale options are used, namely 1, 2 and 4 mm, although it will be appreciated that other scale values could possibly be used to achieve the same result.

From the Gaussian derivatives, a Hessian matrix may be constructed. The eigenvalues of this matrix describe the local structure of the image. The Hessian matrix is constructed from the partial derivatives of the image:

$$H(I) = \begin{bmatrix} \frac{\partial^2 I}{\partial x^2} & \frac{\partial^2 I}{\partial x \partial y} \\ \frac{\partial^2 I}{\partial y \partial x} & \frac{\partial^2 I}{\partial y^2} \end{bmatrix}$$

where I(x,y) is the image intensity at position (x,y). The combination of eigenvalues used as feature is the ratio $$q_s = \frac{L_1 + L_2}{L_1 + L_2 + \epsilon}$$

where $L_1$ is assigned the largest eigenvalue and $L_2$ the smallest of the Hessian respectively, the absolute value of both is taken before the quotient above is determined. $\epsilon$, a number much smaller than 1 is used to avoid instabilities associated with near zero division.

As explained above, this enables some mathematical definition of the characteristics of the structure, for example whether it is an elongated structure or not. For example, if there is a significant difference between $L_1$ and $L_2$, this will be reflected in the magnitude of the resulting quotient value $q_s$ that gives an indication of the aspect ratio of tissue structures in the image. For example, if $q_s$ is large, then it will be clear that the shape is elongate. Conversely, if the magnitude of the resulting $q_s$ is small, then it implies that there is little difference between $L_1$ and $L_2$ and that the structure is more circular. The denominator of the equation allows normalisation of the quotient. Therefore, the quotient measures the elongatedness in an image at a certain location (x,y) at the specific scales. It is invariant to rotation of the image and scaling intensities. The outcome of the quotient value provides an indication of intensity of the structure. For example, a negative value indicates a dark elongated structure whereas a positive value indicates a bright elongated structure.

Alternatively expressed, the Hessian at scale s is defined by:

$$H_s(I) = \begin{bmatrix} \frac{\partial_s^2 I}{\partial_s x^2} & \frac{\partial_s^2 I}{\partial_s x \partial_s y} \\ \frac{\partial_s^2 I}{\partial_s y \partial_s x} & \frac{\partial_s^2 I}{\partial_s y^2} \end{bmatrix}$$

where $\partial_s$ denotes the Gaussian derivative at scale s. As set out above, the scales used are 1, 2 and 4 mm. The features used are given by the quotient:

$$q_s = \frac{|e_1| - |e_2|}{|e_1| + |e_2|}$$

where $e_1$ and $e_2$ are eigenvalues of the Hessian at specific scale s and $e_1 > e_2$. This ratio is related to the elongatedness of the image structure at the point (x,y) at the scale s that defines the image as having a "stripy" quality.

As before, this enables some mathematical definition of the characteristics of the structure, for example whether it is an elongated structure or not. For example, if there is a significant difference between $e_1$ and $e_2$, this will be reflected in the magnitude of the resulting quotient value $q_s$ that gives an indication of the aspect ratio of tissue structures in the image. For example, if $q_s$ is large, then it will be clear that the shape is elongate. Conversely, if the magnitude of the resulting $q_s$ is small, then it implies that there is little difference between $e_1$ and $e_2$ and that the structure is more circular. The denominator of the equation allows normalisation of the quotient. Therefore, the quotient measures the elongatedness in an image at a certain location (x,y) at the specific scales. It is invariant to rotation of the image and scaling intensities. The outcome of the quotient value provides an indication of intensity of the structure. For example, a negative value indicates a dark elongated structure whereas a positive value indicates a bright elongated structure.

By using the matrix to calculate quotients for every point in the image, it is possible to deduce characteristics about what sort of structure is present in the image. For example, it is possible to determine the elongatedness or fibrous nature of the surrounding tissue.

The next step is to apply k-means clustering to the derived quotient values. K-means is a popular way to perform unsupervised clustering of data. It is employed to divide a mammogram into four structurally different areas (described below). Subsequently, based on the size of the areas, a density score is determined. As explained below, this score is a linear combination of areas that maximise the separation of HRT and placebo patients.

It is an approximate method to find the unknown mean vectors of a multivariate distribution. The rationalisation behind this is that if a point is close to the mean of a class or cluster, the probability that it belongs to that cluster is high. This probability is based on the statistical characteristics of each point.

Figure 6:
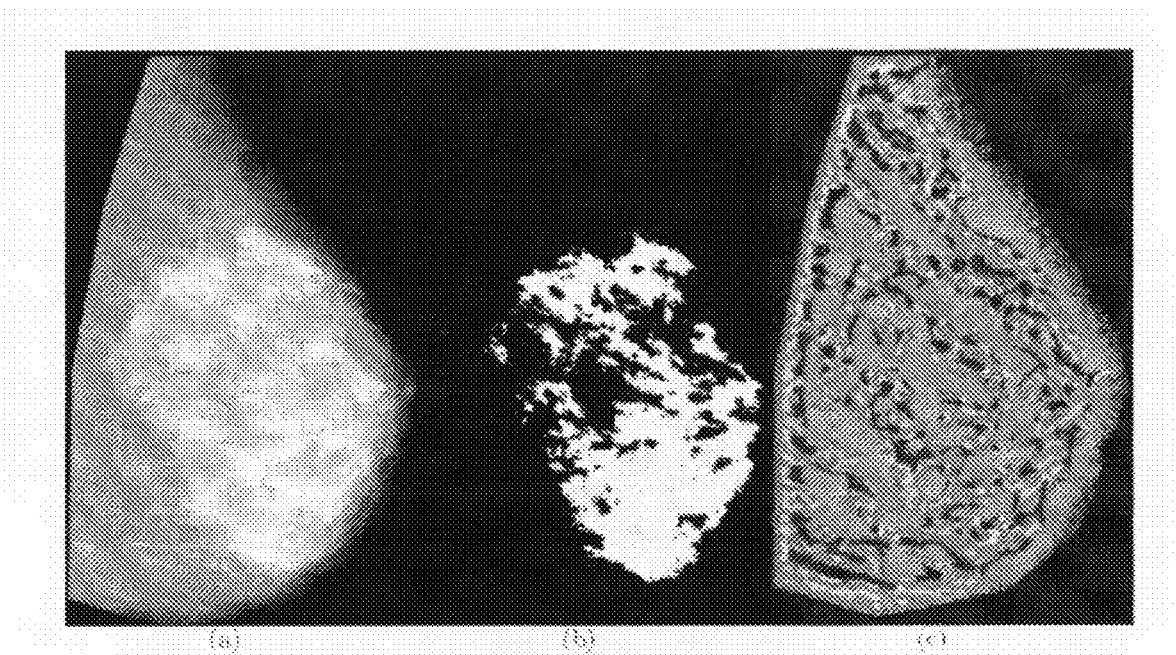
FIG. 6 shows an illustration of automatic thresholding and stripiness.

A visualisation of the threshold and stripiness methods is shown in FIG. 6.

Figure 7:
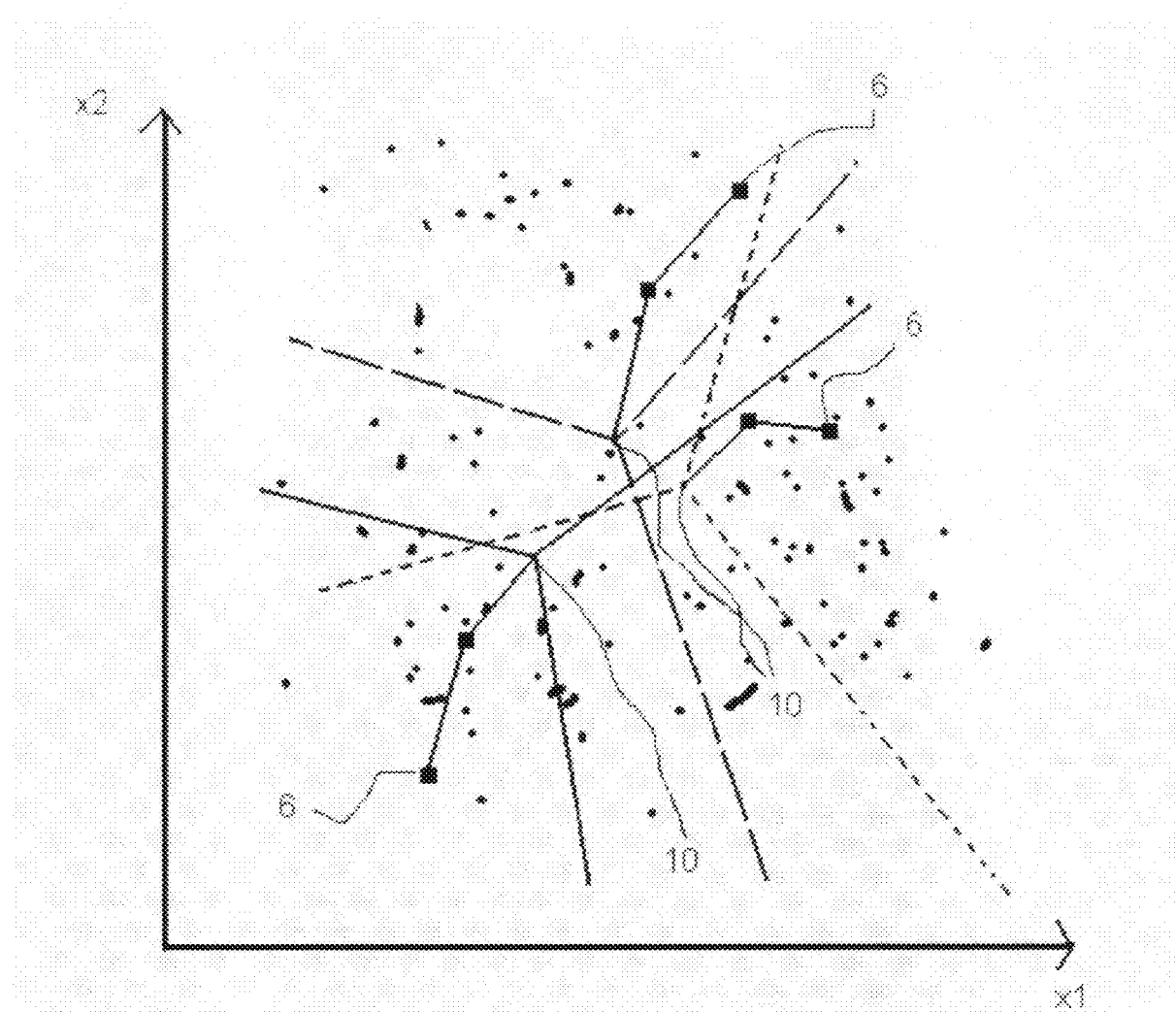
FIG. 7 shows trajectories for the means of the k-means clustering procedure applied to two-dimensional data.

Each quotient value is plotted in 3-dimensional space, where for each pixel, 3 quotient values are determined relating to the three different scales of Gaussian derivatives. For example, the x-dimension may be used for 1 mm, the y-dimension for quotient values determined at 2 mm and the z-dimension for 4 mm. An example of this process is shown in FIG. 7 on a 2-dimensional axis. Three starting points 6 that are not too close to each other, within the three axes, are chosen at random. It should be appreciated that three points are chosen in this embodiment to result in three clusters. However, any number of starting points could be chosen depending on the desired number of clusters. In a preferred embodiment, four starting points would be selected.

The algorithm below is then performed iteratively. The algorithm involves identifying for each quotient, which of the three random starting points is nearest. Each quotient is then effectively "affiliated" with the point to which it is closest and it is notionally classified as belonging to the same group. The same procedure is performed for each quotient, until each quotient belongs to one of the four starting points. For each resulting group of quotients, a mean is calculated and the mean quotient value is assigned as the new starting point 8, thus resulting in three new starting points.

```
Initialize n,c,μ₁,μ₂,...,μ_c.
repeat
    classify n samples according to nearest μ_i
    recompute μ_i
until no change in μ_i
return μ₁,μ₂,...,μ_c
```

The algorithm is performed iteratively until there is no change between the starting point and the resulting mean point. These three points 10 become the cluster points that will be used for future detection.

These cluster points may then be used to obtain a density score. In the training phase, a large collection of randomly chosen pixels from the different images in the data set are used to generate a representative collection of features. Preferably, these features are divided into four clusters using k-means clustering. The means are stored and used for nearest mean classification. In the testing phase, this nearest mean classifier is used to score each mammogram as follows:

Extract Hessian-based features
Classify each pixel in one of four classes using the nearest mean classifier
Determine relative areas of the classes
Compute the score from those areas.

Figure 8:
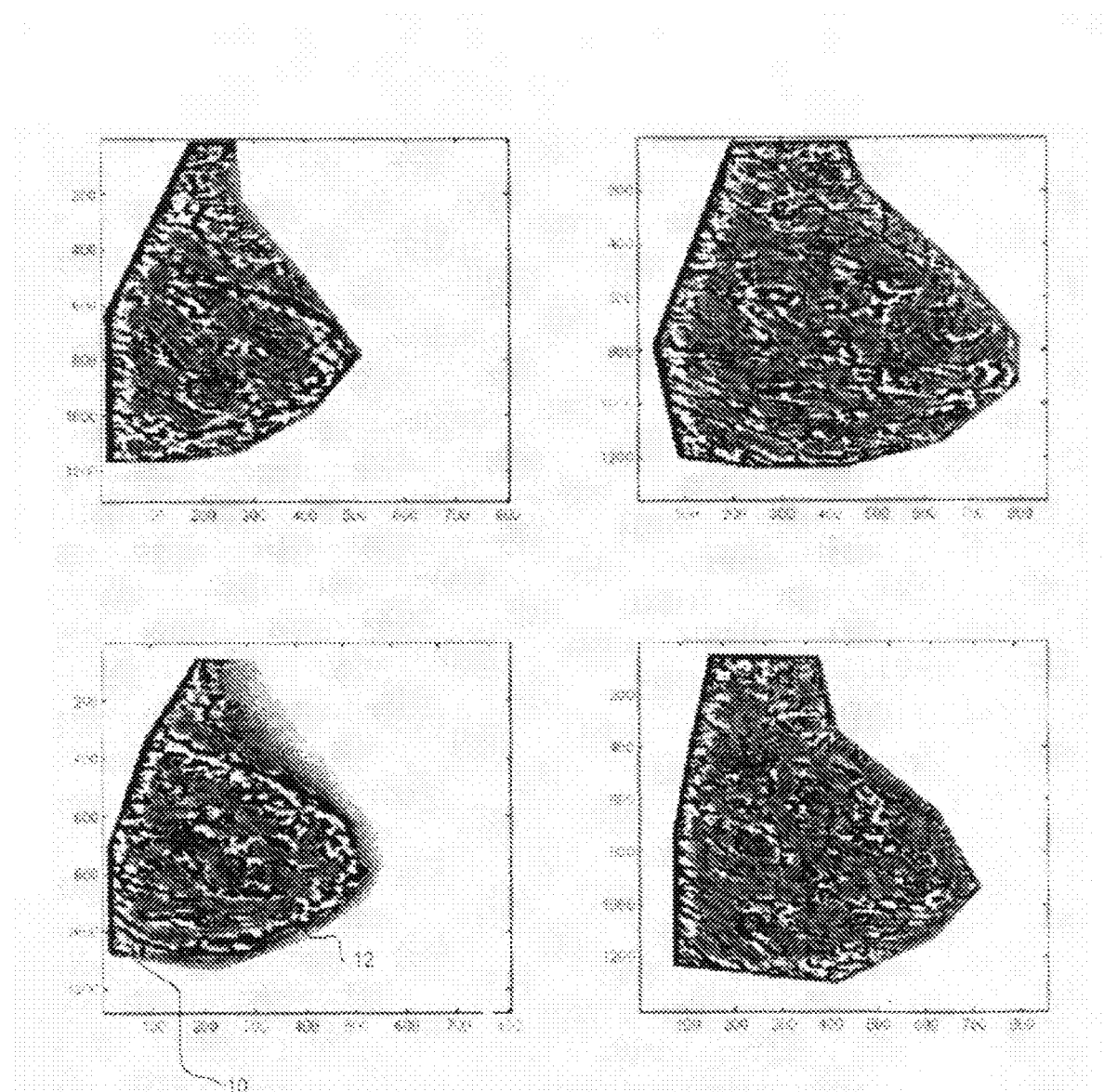
FIG. 8 shows four segmented breast images indicating the different clusters.

To summarise, Hessian matrices are prepared for each Gaussian variable scale and quotient values obtained for each pixel. As there are three possible scales, each pixel has three different quotient values. The quotient values (for values of one scale at a time) are plotted alongside the four cluster means derived from the k-means clustering. Each quotient is assigned to the cluster mean that it is nearest to resulting in four real clusters. Each cluster mean will be representative of the different characteristics of the breast tissue. The result of classifying the pixels of an image into each of four classes is shown in FIG. 8, one panel per class.

The area of each cluster is determined and from this a score is obtained that utilises the difference in density between the different areas. The final score is based on a linear combination of the relative areas of the classes in the breast image. The optimum is determined using a linear discriminant analysis given the HRT group and the placebos. This optimal linear combination corresponds roughly to "2xArea1−1xArea2".

To arrive at this rule, a linear discriminant analysis (LDA) on the breast area features was employed. LDA is a standard statistical pattern recognition technique which can be used to discriminate between two or more classes. In the first instance, the aim of this method is to discriminate between HRT and placebo. LDA results in a decision rule that uses a linear combination of its input features. The remaining two areas contributed only with small coefficients that could be left out.

From this LDA, the two Areas 1 and 2, required for this calculation can be determined. The LDA determines which of the areas should be used for the above calculation based on the characteristics in the different clusters. This should be known to those in the art and will therefore not be further described herein.

By using the methods described above to extract features, compute clusters and construct a nearest means classifier to assign new image pixels to clusters, it is possible to obtain a new set of data consisting of labelled images. First a million pixels are selected at random among the images in the data set for feature extraction. The extracted features are normalised to zero mean and unit variance. Then the k-means algorithm is applied and a classifier (NMC) is constructed from the four estimated mean vectors. This classifier is applied to the feature versions of all the images to get a new data set.

Each image in this new set consists of background and breast tissue that has been divided into four classes. These classes are tested as density measures separately and together using a linear classifier. A linear classifier is used because it generalises and is simple. The density score is the signed distance to the decision hyper-plane. The evaluation of the density measure is done in a leave one out approach. The linear classifier is trained on the N-1 images and used to predict if the remaining image is from a HRT or a placebo patient.

The ability of a certain combination of views to separate the HRT group from the placebo group is evaluated with an ROC area score. ROC stands for "Receiver Operating Characteristic". ROC curves depict the performance of a diagnostic test. The y-axis is sensitivity and the x-axis is specificity.

The feature used for separation is the temporal change in density, $\Delta D_x = D - D_y$, where x and y refer to the density of images from different years. If one view is used, a patient is represented by one feature and similarly if two views are used, two features characterise each patient. To construct the ROC curves, it is necessary to calculate the likelihood of being an HRT patient from the feature(s). From basic Bayesian decision theory, the probability that an observed feature vector x belongs to class j, denoted $p(w_j|x)$, is given by $$p(w_j | x) = \frac{p(x | w_j) P(w_j)}{p(x)}$$

where $p(w_j|x)$ is known as the posterior probability, $p(x|w_j)$ the likelihood and $P(w_j)$ the prior. Since it is desired to compare probabilities and select the highest $p(w_j|x)$ it is possible to ignore the common denominator. This leads to a decision function of the form $$d_j(x) = p(x|w_j) P(w_j)$$

where it is possible to classify as HRT if $d_{HRT}$ is larger than $d_{placebo}$ and vice versa.

Figure 9:
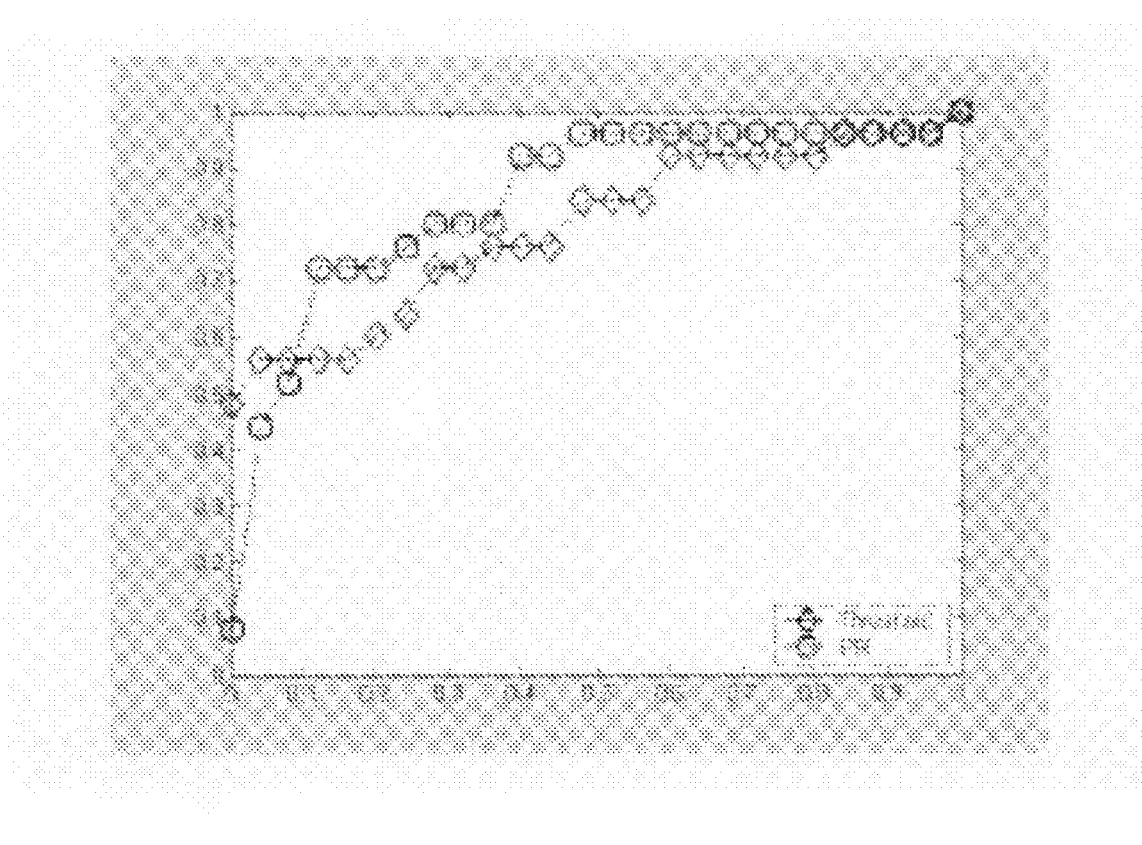
FIG. 9 shows a comparison of the ROC curves resulting from the pattern recognition based density measure and those resulting from the adaptive threshold measure.

Shown in FIG. 9 are the resulting ROC curves from using the described pattern recognition based density measure ("PR density"—circles) compared to the previously known adaptive threshold ("TH density"—diamonds) method. It shows that the PR density does a better job at classifying the patients into HRT and placebo groups. In terms of p-values the two measures are comparable, but again the PR-density is slightly better. When checking if the density means of the HRT group in 2001 is significantly higher than in 1999, the TH-measure yields a p-value of 0.002 and the PR measure 0.0002.

In the analysis of the density measurements, the patient populations were divided into subgroups. HRT at beginning of study (H99), HRT at end of study (H01), placebo at beginning of study (P99), and placebo at end of study (P01). Ttests were performed on four subgroup combinations. Unpaired ttests on P99 vs H99 and P01 vs H01. Paired ttests on P99 vs P01 and H99 vs H01. The zero hypothesis is in each case that the two tested subgroups have identical density means, and the alternative hypothesis that they have different density means. This can be seen in the table below:

| Method | Test | | | |
| --- | --- | --- | --- | --- |
| | P99 vs P01 | H99 vs H01 | P99 vs H99 | P01 vs H01 |
| BI-RADS | 0.3 | <0.001 | 0.3 | 0.1 |
| Interactive TH | 1 | <0.001 | 0.8 | 0.02 |
| Automatic TH | 0.07 | <0.001 | 0.8 | 0.2 |
| Stripiness | 0.9 | 0.004 | 0.9 | 0.02 |

This table displays the p-values for the different tests. As can be seen, no method separates the P99 and P01 groups significantly. More importantly, no method separates the P99 and H99 groups, confirming successful randomisation of the trial. All methods are able to separate H00 and H01 to a very high degree of significance. Only the interactive percentage density and the stripiness (present invention) significantly separate H01 from P01.

Thus, unsupervised clustering of mammograms based on the quotient of Hessian eigenvalues at three scales result in tissue classes that can be used to differentiate between patients receiving HRT and patients receiving placebo. It is an automated method for measuring the effect of HRT as structural changes in the breast tissue. This measure can be interpreted as an intensity variant form of HRT induced structural density. Furthermore, the interactive threshold shows better capability to separate the HRT patients from the placebo patients at the end of the study than the categorising BI-RADS methodology.

It is possible to separate the HRT patients from placebo patients to a very high degree using the proposed measure of structural density.

This approach using unsupervised learning to train the classifier may therefore be summarised as follows:

Training Phase [Based on Several Images]
1. Feature extraction: For all images, for preferably every pixel, at three scales, extract Hessian matrix and calculate the three "stripiness" quotients form those.
2. Clustering: Assign every feature vector of three quotients [or a large enough subset of these feature vectors] to one of K groups using K-means clustering; in particular, we take K=4.
3. Train classifier: determine the means of the K groups and associate one of K labels with every single one of the groups, i.e., we train a nearest mean classifier.

Test Phase [for a New Image or Image not Used in the Training Phase]
A. Feature extraction: For the image, for preferably every pixel, at the three same scales, extract Hessian matrix and calculate the same three "stripiness" quotients form those.
B. Classification/labelling: Using the trained nearest mean classifier, assign one of the K=4 labels to every pixel based on its associated feature vector.
C. "Density" score calculation: Determine the relative area in the breast for all of the K=4 classes and use the rule 2×Area1−1×Area2

In an alternative approach, we use a classifier trained by supervised learning.

Figure 3:
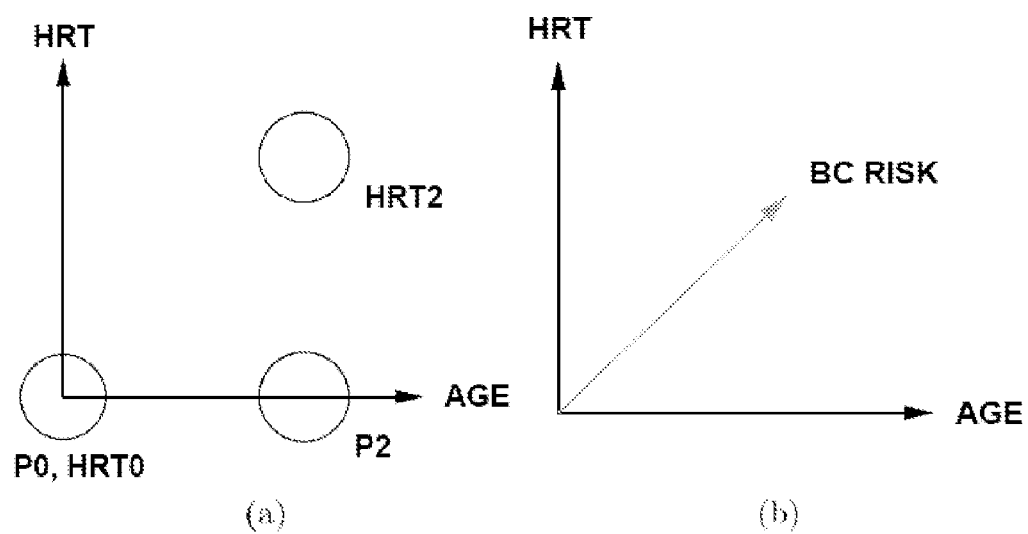
FIG. 3 illustrates the different effects of changes in breast density.

The inventors perceive breast density as a structural property of the mammogram that can change in various different ways explaining different effects. As can be seen in FIG. 3, the different effects are shown with respect to hormone replacement treatment and age. Each circle shown in FIG. 3(a) represents a probability density cloud for the patient groups receiving placebo and HRT at a start time $t_0$ and a later time $t_2$ respectively. Aging and HRT treatment are hypothesised to be two different effects. Breast cancer risk may be yet another dimension, as illustrated in FIG. 3(b).

The method described next is derived from observing the biological effect in a controlled study. The method is constructed to observe any one specific physiological effect and is invariant to affine intensity changes. Accordingly, digitised mammograms from an HRT study were examined in an example below to see if the effect of aging and HRT treatment are indeed two different effects.

The study population was a randomly chosen subpopulation from a 2-year randomised, double-blind, placebo-controlled clinical trial in which the participants received either 1 mg 17 β-estradiol continuously combined with 0.125 mg trimegestone (n=40), or placebo (n=40) for 2 years. At entry into the study, women were between 52 and 65 years of age, at least 1 year postmenopausal with a body mass index (BMI) less than or equal to 32 kg/m².

Breast images were acquired at the beginning ($t_0$) and the end of the 2-year treatment period ($t_2$) using a Planmed Sophie mammography X-ray unit. The images were scanned using a Vidar scanner to a resolution of approximately 200 microns with 12 bit grey-scales. Delineation of the breast boundary connected with straight lines, resulting in a decagon region of interest. Only the right mediolateral oblique view was used, since it has been shown that a reliable measure of the breast density can be assessed from any one view.

Since HRT has been shown to increase mammographic density, these images can be used to evaluate density measures by their ability to separate the HRT and placebo populations. Furthermore, aging effects can be detected by comparing the placebo group at $t_0$ and $t_2$. In the following, the groups are donated as P0, P2, H0 and H2 for placebo and treatment at $t_0$ and $t_2$ respectively.

The aim was to establish a new density measure based on data-mining of patient groups and machine learning. This approach is based directly on the image data and is as such independent of radiologist readings. It does require data expressing change in density and a selection of features to use. A pixel classifier is used, since it is desired to learn the local appearance of dense tissue. The large overlap between classes on pixel level (both dense and non dense mammograms have many similar pixels, and also both dense and non dense mammograms appear in both the placebo and HRT population) disappears to a large degree when fusing the pixel probabilities to a single posterior for the image.

Two collections of images (A and B) are given together with a suitable feature space. Features are sampled in a large number of positions from each image. In this way each image is represented by a set of features. The sets are combined into two subgroups representing the collections A and B to provide a basis for classifier training. A nonlinear classifier is trained on this basis and used to compute probabilities of belonging to either A or B for all pixels in all images. These posteriors are then fused to one posterior probability for each image.

There are some considerations regarding the nature of a suitable feature space for the particular setting of x-ray mammography. Certain properties are desirable, specifically invariance to transformations, which do not relate to the underlying signal, and low noise sensitivity.

Looking at historical, multi-site data, one would like features to be invariant to the monotonic transformations caused by variations in film material, development and digitisation. Processes, such as change in x-ray tube voltage, may induce non-monotonic intensity changes, potentially altering the tissue appearance radically. One cannot expect to gain invariance with respect to these changes, but only create measurements that are robust to this type of variations. Hence macroscopic shape measurements are excluded, and the measurements are restricted to local features of the image. Since local orientation and position may be changed due to variations in compression direction and amount, only local features that are invariant with respect to Euclidean transformations are used. These will also be invariant to effects caused by small translational variations in positioning.

The noise in the images is assumed to be uncorrelated point noise caused by a mixture of Poisson and Gauss processes. The presence of noise means one can not rely on pure analysis of isophotes and some robustness of the features with respect to which noise is needed.

Here, following determination of the $q_s$ values as described previously, based on the stripiness features, the density measure is derived by training a pixel classifier on subsets of image data in a supervised learning procedure. The subsets may respectively comprise images expected to have a lower density as one subset and images expected to have an increased density as a second subset. For instance in a study where a group of women are divided into a treatment group H for HRT treatment and a placebo group P and are both followed over a time period running from $t_0$ to $t_2$, suitable subsets of interest include subsets devised such that there should be some detectable change in density. Four combinations of subgroups are used in this example:

HRTL (Longitudinal)

Subsets H0 (group H at time $t_0$) and H2 (group H at time $t_2$) are used to capture the effect of HRT. There is also an effect of aging, but it is expected to be much lower than that of HRT. The trained classifier is referred to as HRTL.

HRTC (Cross-Sectional)

Subsets P2 (placebo group P at time $t_2$) and H2 are used to capture the effect of HRT. Separation between classes is expected to be lower, since inter-patient biological variability is diluting the results. The trained classifier is referred to as HRTC.

Age

The baseline population (P0 (placebo group P at time to) and H0) is stratified into three age groups, and the first and last tertile are used to capture the effects of age. The second tertile is used as control population. The trained classifier is referred to as AGE.

PlaL (Longitudinal)

Subsets P0 and P2 are used to capture any effect of non-affine, time dependent image changes. If no such changes are present in the images, this selection of subsets will also yield an age classifier. The trained classifier is referred to PlaL.

In each case the two subgroups get a distinct label and a k nearest neighbours (kNN) classifier is trained to separate pixels from the two classes.

We have applied this to the study population from the 2 year trial. Due to the limited number of patients, the data was not split up into a training and a test set. Instead the classifier was trained on all but a pair of images (one image from each class) and pixel probabilities are computed for this pair using the trained classifier. This is repeated until all pixel probabilities for all images are computed. This technique is similar to leave-one-out, but is modified to leave-two-out since leaving one sample from class A out introduces a bias for belonging to class B, especially when the number of samples are relatively low (80 for the HRT classifiers and 56 for the age classifier). Feature vectors are extracted from 10,000 randomly selected pixels within the breast region in each image.

Figure 5:
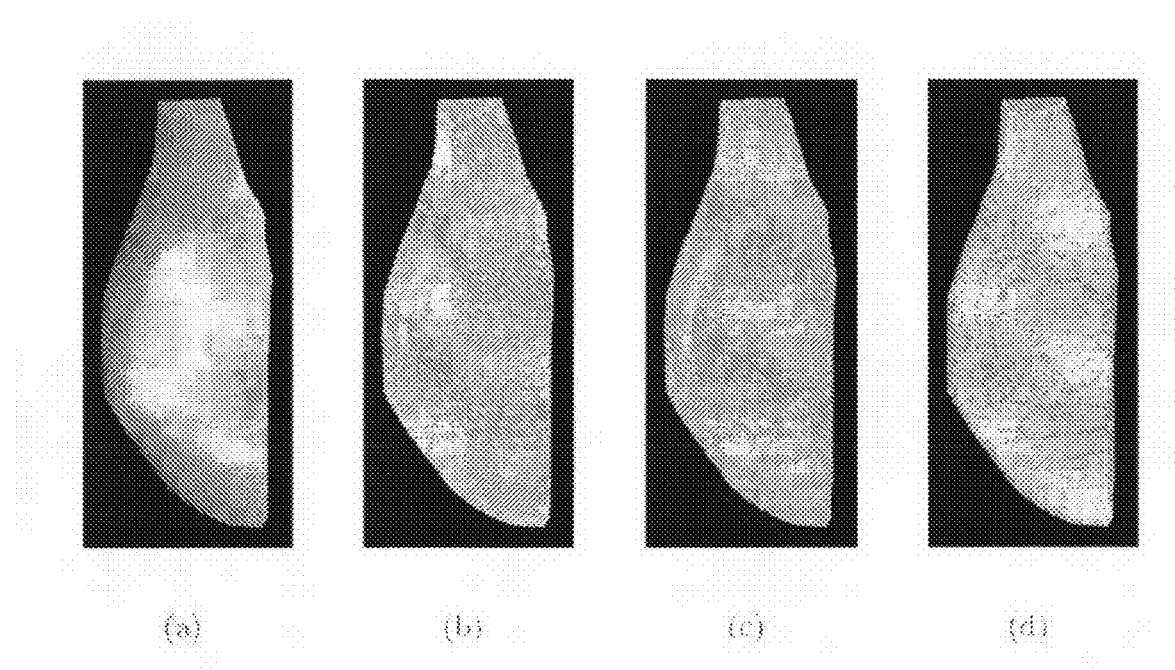
FIG. 5 shows an example of a mammogram with corresponding pixel probability maps for pixel classification using the classifiers HRTC, HRTL and AGE.

To go from pixel density probabilities to patient density scores, the average pixel probability within the breast area is used. Several other fusion schemes for combining the posterior probabilities of the pixels to a single posterior for the image are possible, including e.g. voting and maximum rule. In general it cannot be said that one is better than the other and no real benefit is expected from using different fusion rules. It is expected that the min and max rule performs poorly since most often an image will contain at least one pixel for each of the extreme values 0 and 1, making separation based on these rules impossible. An example of a mammogram with corresponding pixel probability maps is shown in FIG. 5. Specifically, FIG. 5(a) shows a mammogram from the data set described above and FIGS. 5(b), (c), and (d) show the pixel classification result using the classifiers HRTC, HRTL and AGE respectively.

FIG. 6 illustrates the effect of automatic thresholding and "stripiness" and shows a) a starting mammogram, b) thresholded density, and c) the tissue clustering described above that is used to get the stripiness density.

Figure 10:
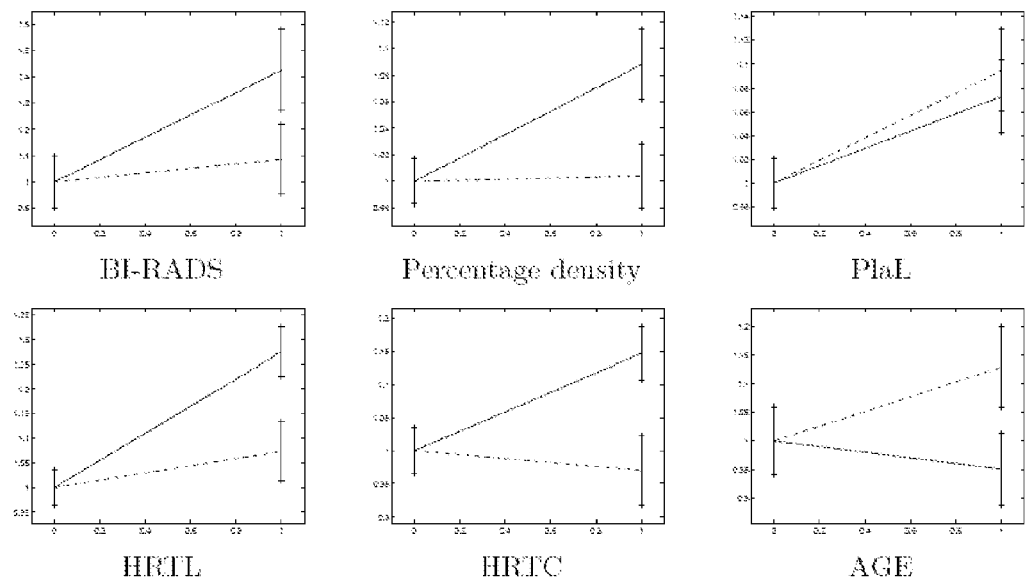
FIG. 10 illustrates the relative longitudinal progression of the different measures of an embodiment of the invention.

The table below shows p-values for all combinations of methods and relevant pairs of groups. The first two columns are paired two-sided t-tests, while the last two columns are unpaired. All three classifiers are based on the same feature set consisting of 10,000 feature vectors for each image, enabling a direct comparison of the methods. FIG. 10 shows the relative density changes using the three different training strategies. Specifically, FIG. 10 shows the relative longitudinal progression of the different measures. The placebo group is indicated with a dashed line and HRT by a solid line. Vertical bars indicate the standard deviation of the mean of the subgroups at $t_2$ and of the entire baseline population at $t_0$.

| Method | Test | | | |
|---|---|---|---|---|
| | P0 vs. P2 | H0 vs. H2 | P0 vs. H0 | P2 vs. H2 |
| BI-RADS | 0.3 | <0.001 | 0.3 | 0.1 |
| Interactive TH | 1 | <0.001 | 0.8 | 0.02 |
| HRTL | 0.08 | <0.001 | 0.7 | 0.01 |
| HRTC | 0.4 | <0.001 | 0.7 | 0.01 |
| Age | 0.004 | 0.4 | 0.8 | 0.07 |
| PlaL | 0.003 | <0.001 | 0.4 | 0.6 |

Figure 11:
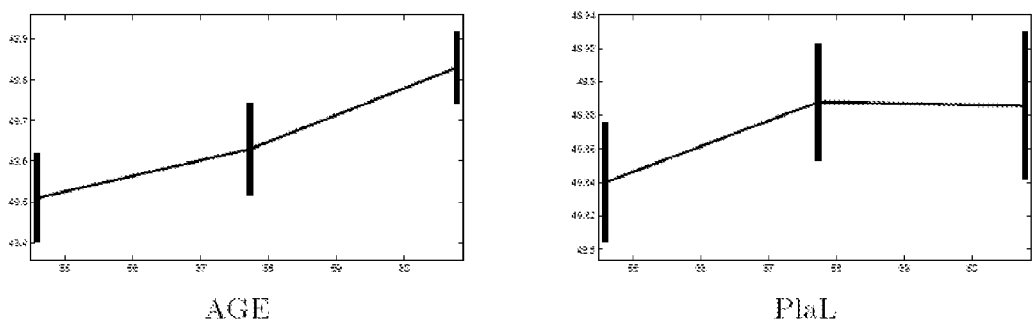
FIG. 11 illustrates the aging density as a function of age in tertiles in the baseline population including standard deviation of the mean.

FIG. 11 examines if the differences between P0 and P2 indicated by the AGE and PlaL classifiers are indeed age effects or a difference in imaging at baseline and follow-up. The baseline population is stratified into three age groups. The AGE measures are significantly different (p=0.015) in the first and last tertile. The PlaL measure shows neither an increasing trend nor significant difference in measurements. These results support that AGE captures aging effects and PlaL detects general differences in images between $t_0$ and $t_2$.

Assuming that PlaL is mainly detecting general image changes from $t_0$ to $t_2$, AGE is the only method significantly detecting the effect of aging. The relatively low p-value for the separation of P0 and P2 detected by HRTL (0.08) is most likely due to the time dependent changes also influencing this other longitudinally trained classifier. These changes are further indicated by the performance of the PlaL classifier, which give similar changes in average image posterior for both the placebo group and the HRT group.

The inverse appearance of HRTC and AGE changes on FIG. 10 suggests that the age-related density and the HRT-density occur along directions in the Hessian-based feature space that are not orthogonal, but rather somewhat pointing in opposite directions. This behaviour is in agreement with density increasing with HRT and decreasing with age.

Thus this method using supervised learning to train the classifier may be summarised as follows:

Training Phase [Based on Several Images]
1. Feature extraction: For all images, for preferably every pixel, at three scales, extract Hessian matrix and calculate the three "stripiness" quotients form those.
2. Train at least one classifier:
Based on the stripiness features, the density measure is derived by training a pixel classifier on subsets of the available data. The subsets are devised such that there should be some detectable change indensity between them. Four combinations of subgroups are illustrated above.

In each case the two subgroups get a distinct label and a k nearest neighbours (kNN) classifier [22] is trained to separate pixels from the two classes.

Test Phase [for a New Image or Image not Used in the Training Phase]
A. Feature extraction: For the image, for every pixel, at the three same scales, extract Hessian matrix and calculate the same three "stripiness" quotients form those.
B. Classification/labelling: Using the trained kNN classifier, assign a posterior probability to every pixel based on its associated feature vector.

The posterior probability, a number between 0 and 1, indicates how much a pixel belongs to one group or the other. For instance, in the specific example described above, if the HRTC classifier assigns a high posterior to a pixel, it indicates that this pixel "looks" like a pixel from an image in the HRT treated patient set.

C. "Density" score calculation: Determine the overall density score by averaging the posterior probabilities over the whole breast region. This average determines the score for that breast image. The score will be a number between 0 and 1. What this number indicates is of course dependent on which classifier is used: e.g. HRTL, HRTC, AGE, etc.

Indeed, with the supervised method we not only demonstrate that we can separate HRT and non-HRT better, but that we can also learn/train other "density" scores. E.g. it appears that AGE tells us something about age progression.

If the method as described above either using supervised or unsupervised learning to train the classifiers is repeated on an image of the same breast some time later, for example, 1 or 2 years in accordance with typical breast screening programmes, it would be possible to compare the differences between the derived density scores to detect differences. In this respect, if the density score has increased, it is probable that the risk of breast cancer has also increased.

It will be appreciated that modifications to or variations of the embodiments described and illustrated may be made within the scope of the appended claims.

The invention claimed is:

1. A method of processing a mammogram image to derive a value for a parameter useful in detecting differences in breast tissue in subsequent images of the same breast or relative to a control group of such images, said derived parameter being a parameter that changes alongside changes in breast density, the method comprising the steps of processing an image of at least part of a breast by:
computing for pixels of the image a quotient value representative of the aspect ratio of tissue structures depicted in the image;
using a trained classifier to classify said pixels according to their respective said quotient values and assigning a score to the respective pixels representing their classification with respect to at least two classes;

deriving said parameter that changes alongside changes in breast density based on the aggregate pixel membership scores of said classes.

2. A method as claimed in claim 1, wherein said trained classifier is trained by unsupervised learning.

3. A method as claimed in claim 1, wherein said trained classifier is trained by supervised learning.

4. A method as claimed in claim 3, wherein said classifier is trained by supervised learning based on a set of images associated with a higher breast density and a set of images associated with a lower breast density.

5. A method as claimed in claim 1, wherein said pixels are scored as belonging to one of said classes.

6. A method as claimed in claim 1, wherein said pixels are scored according to their probability of belonging to at least one of said classes.

7. A method as claimed in claim 1, wherein said quotient value is determined for each said pixel at each of a plurality of scales.

8. A method as claimed in claim 1, wherein said quotient values are determined as the normalised difference between eigenvalues of a Hessian matrix based on Gaussian derivatives at a predetermined scale of pixels of the image, which Gaussian derivatives relate the intensity of each pixel to the intensities of the neighbours of said pixel.

9. A method as claimed in claim 1, comprising
plotting said quotient values on a pre-determined model of a cluster map, said cluster map having at least two pre-plotted points;
clustering the plotted values around said at least two pre-plotted points to result in two discrete clusters; and
deriving said parameter that changes alongside changes in breast density by computing the difference in area between said two clusters.

10. A method as claimed in claim 9, wherein the pre-determined model is defined in 3-dimensional space in which the three dimensions respectively represent the quotient value when calculated at a respective one of three different scales.

11. A method as claimed in claim 9, wherein the step of clustering further comprises:
calculating which of said at least two pre-plotted points each plotted value is closest to; and
assigning each value accordingly to said closest pre-plotted point to result in said two discrete clusters of plotted points.

12. A method as claimed in claim 9, comprising a preliminary step of preparing said pre-determined model of the cluster map incorporating said at least two pre-plotted points.

13. A method as claimed in claim 12, wherein the step of preparing the model of the cluster map comprises:
a) computing a quotient value for pixels in a test image of a breast based on the results of Hessian matrices compiled for said pixels in the image;
b) plotting each quotient value in 3-dimensional space;
c) randomly selecting at least two points amongst the quotient values as starting points;
d) calculating the distance between each quotient value and each starting point and assigning each quotient value to the starting point to which it is nearest;
e) calculating a mean of each group of points and redefining the starting point as the calculated mean point;
iteratively repeating steps d) and e) until the calculated mean point is equal to the starting point, whereby the final calculated mean points are arranged to be the pre-plotted points of the model of the cluster map.

14. A method as claimed in claim 9, wherein the number of pre-plotted points determines the number of resulting clusters.

15. A method as claimed in claim 9, wherein the pre-determined model of the cluster map has four pre-plotted points.

16. A method as claimed in claim 15, wherein four points are randomly selected as starting points to result in said four pre-plotted points for the model of the cluster map.

17. A method as claimed in claim 14, wherein the Hessian matrices are derived from Gaussian derivatives of the pixels in the image.

18. A method as claimed in claim 17, further comprising deriving Gaussian derivates at three different scales of the image to result in three different quotient values for each of said pixels, wherein the three quotient values correspond to the three dimensions of the pre-determined model.

19. A method as claimed in claim 9, wherein said quotient values define characteristics representative of the shape of objects present in the image.

20. A method as claimed in claim 9, wherein a quotient value of relatively large magnitude represents a substantially elongate object located in the image.

21. A method as claimed in claim 1, further comprising deriving a parameter of the same breast at a subsequent period of time and computing the difference of the first and subsequent parameter, wherein the difference is representative of changes in the breast tissue of the breast.

* * * * *